(12) United States Patent
Mainville (10) Patent No.: US 9,789,412 B2
(45) Date of Patent: Oct. 17, 2017

(54) WHEELED RIDING DEVICE (71) Applicant: Michael John Mainville, Saint Augustine, FL (US)

(72) Inventor: Michael John Mainville, Saint Augustine, FL (US)

(73) Assignee: Michael John Mainville, Saint Augustine, FL (US)

(*) Notice: Subject to any disclaimer, the term of this patent is extended or adjusted under 35 U.S.C. 154(b) by 119 days.

(21) Appl. No.: 15/135,920

(22) Filed: Apr. 22, 2016

(65) Prior Publication Data
US 2016/0318562 A1 Nov. 3, 2016

(51) Int. Cl.
A63C 17/01 (2006.01)
A63H 3/04 (2006.01)
B62D 51/00 (2006.01)
A63C 17/12 (2006.01)
A63H 3/02 (2006.01)
A63H 3/52 (2006.01)
B60L 15/20 (2006.01)
A63C 17/00 (2006.01)
B60L 11/18 (2006.01)

(52) U.S. Cl.
CPC ............ *A63H 3/04* (2013.01); *A63C 17/0046* (2013.01); *A63C 17/013* (2013.01); *A63C 17/015* (2013.01); *A63C 17/12* (2013.01); *A63H 3/02* (2013.01); *A63H 3/52* (2013.01); *B60L 11/1877* (2013.01); *B60L 15/20* (2013.01); *B62D 51/001* (2013.01); *B60L 2200/24* (2013.01); *B60L 2220/44* (2013.01); *B60L 2260/28* (2013.01)

(58) Field of Classification Search
CPC ...... A63C 17/01; A63C 17/013; A63C 17/015
See application file for complete search history.

(56) References Cited

U.S. PATENT DOCUMENTS

| 5,513,865 A * | 5/1996 | Brooks ................. A63C 17/01 280/11.27 |
| 5,868,408 A * | 2/1999 | Miller ................. A63C 17/0046 280/11.28 |
| 6,938,907 B2 * | 9/2005 | Hamy ................... A63C 17/01 280/87.042 |
| 2010/0222941 A1 * | 9/2010 | Chang ................. A63C 17/015 701/2 |
| 2014/0326525 A1 * | 11/2014 | Doerksen ............... A63C 17/12 180/181 |

* cited by examiner

Primary Examiner — Bryan Evans (57) ABSTRACT

The wheeled riding device employs a frame system mounted to the bottom of the deck, independent suspension links pivotally connect to the wheel assemblies enabling four wheel independent suspensions. A centrally mounted steering and suspension pivot, provides both steering control and suspension attachment for the shock and spring. The device is controlled by the rider using body movement, and a hand held remote when electrically driven. Whether manually or electrically propelled the invention brings improvements in both steering and ride stability while riding over adverse terrain.

18 Claims, 9 Drawing Sheets

WHEELED RIDING DEVICE

FIELD OF THE INVENTION

The invention relates to a wheeled riding device which provides both four wheel steering, and four wheel independent suspensions providing improved stability over adverse terrain.

BACKGROUND OF THE INVENTION

Skateboards are typically used for recreation, or transportation. They can be pushed by foot, gravity, or electrically driven. When a skateboard is used for off road purposes it is sometimes referred to as a Mountain board, or Dirt board. They are well documented in the art. Skateboards typically feature 4 small polyurethane wheels. Off-road skateboards typically feature 4 larger air filled rubber tires. A typical skateboard does not feature any form of suspension, whether being used on or off road, although some have in the past. Skateboards consist of a board typically made of wood, commonly referred to as the deck. The deck is what a rider stands on while riding a skateboard. The deck is mounted to a set of trucks that provide the axles for mounting wheels onto. Trucks allow for two wheels to be mounted on each truck, thereby providing four wheels under the deck for the rider to roll on while standing on the deck. Trucks are also the steering mechanism, for the skateboard. They are mounted in an apposing direction to provide four wheel equal steering.

Skateboards of various designs having a pair of trucks in opposing orientation are well known in the art. Typical prior art skateboard trucks consists of a base plate, a hanger, a pivot member, a pivot cup, an axle coupled to the hanger, a kingpin and bushings that allow for the tilting and rotating of the hanger with respect to the base. The bushings establish the amount of force a user must exert in order to tilt and rotate the hanger of the truck. The pivot angle of the trucks is what determines the steering ability of the trucks. For example, it is typically understood that a high pivot angle makes the trucks more sensitive to tilting and facilitates steering by tilting and a lower pivot angle makes trucks less sensitive to tilting and thereby makes the skateboard more stable.

Prior art designs of axle support mechanisms for a skateboard provide adequate performance over smooth surfaces, but can become hazardous when rocks, uneven pavement or other obstacles are encountered, resulting in the rider being ejected from the skateboard. Variations of the typical skateboard truck have utilized springs, shocks, and bushings to provide movement of the axle, thereby allowing for some limited suspension movement to mitigate this hazard. Unfortunately since both axles tend to be mechanically coupled together, a bump or disturbance action to one side of the truck will result in direct movement of the other, resulting in an adverse steering reaction that can also be hazardous.

There have been many different variations of suspension mechanisms to absorb shock, and provide the user a safer ride over rough terrain. Although some of these prior art devices may provide limited absorption when small hazards are encountered by both wheels, none have been able to provide novel attributes of the present invention regarding independent shock absorption, and ride stability.

By way of example, U.S. Pat. No. 4,152,001 issued to Christianson, was based on an axle hanger mounted on a plate shaped member. Although it does allow for limited movement of both axles together, it lacks a steering alignment mechanism to enable the hanger to maintain the steering tilt axis. As movement commences, steering geometry and stability losses it's integrity.

A more recent example is U.S. Pat. No. 9,295,902 B2 issued to Lininger, provides the same type of axle movement of the art mentioned above, but provides a steering alignment mechanism to enable the hanger to maintain the steering tilt axis. This improves stability, but does not provide independent movement of the axles.

Lastly U.S. Pat. No. 7,219,907 issued to Chang, features an independent movement of the axles due to an elastomeric compression bushing, mounted inside a centrally mounted swivel mechanism. The swivel mechanism is low to the ground, and becomes even lower when compressed; creating a ground clearance problem that is undesirable.

These know devices are not very practical for riding on steep, rough, or adverse terrain. The subject invention and embodiments has improved upon many of the limitation exhibited in prior art. The result is a device that enables the user to easily traverse terrain that would be previously difficult.

SUMMARY OF THE INVENTION

The subject invention and embodiments comprises of a method and apparatus for a wheeled riding device with four wheel independent suspension. The subject invention and embodiments may be manually or electrically driven. The invention employs a frame system mounted to the bottom of the deck, independent suspension links pivotally connect to the wheel assemblies. The wheeled riding device and its embodiments are supported by a centrally mounted steering and suspension pivot, providing both steering control and suspension attachment for the shock and spring. The invention brings improvements in both steering and ride stability while riding over adverse terrain.

BRIEF DESCRIPTION OF THE DRAWINGS

These and other features and advantages of the present invention and other embodiments will become more readily appreciated as the same becomes better understood by reference to the following detailed description when considered in the connection with the accompanying drawings within. These drawings are for the purpose of illustration and not to be in any way limiting.

DETAILED DESCRIPTION OF THE DISCLOSURE

Figure 1:
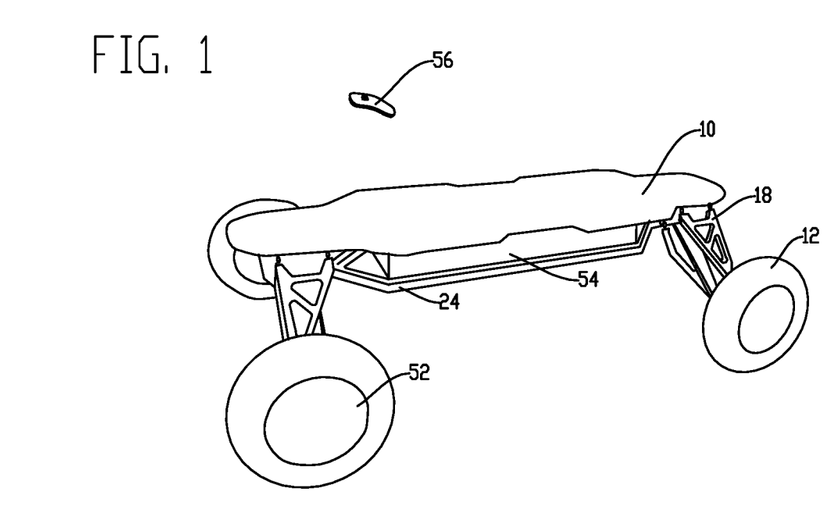
FIG. 1 is a perspective view of the wheeled riding device and rider wireless transmitter.

FIG. 1 illustrates perspective view of one embodiment of the invention constructed in accordance with teachings of the present invention. This device Can be used for entertainment, sport, exercise, or training. When operating this device, the rider stands on top of the deck 10, holding the wireless transmitter in hand. Speed or braking commands are generated by moving a lever forward or backward. As shown the device consists of a deck 10, securely mounted on top of a frame 24 providing attachment points for the enclosure 54, and suspension components like the upper suspension link 18. The ground contacting element 12 is rotated by a single sided hub motor 52 contained within the wheel. Each wheel is able to move up and down independently to provide controlled suspension over adverse terrain.

Figure 2:
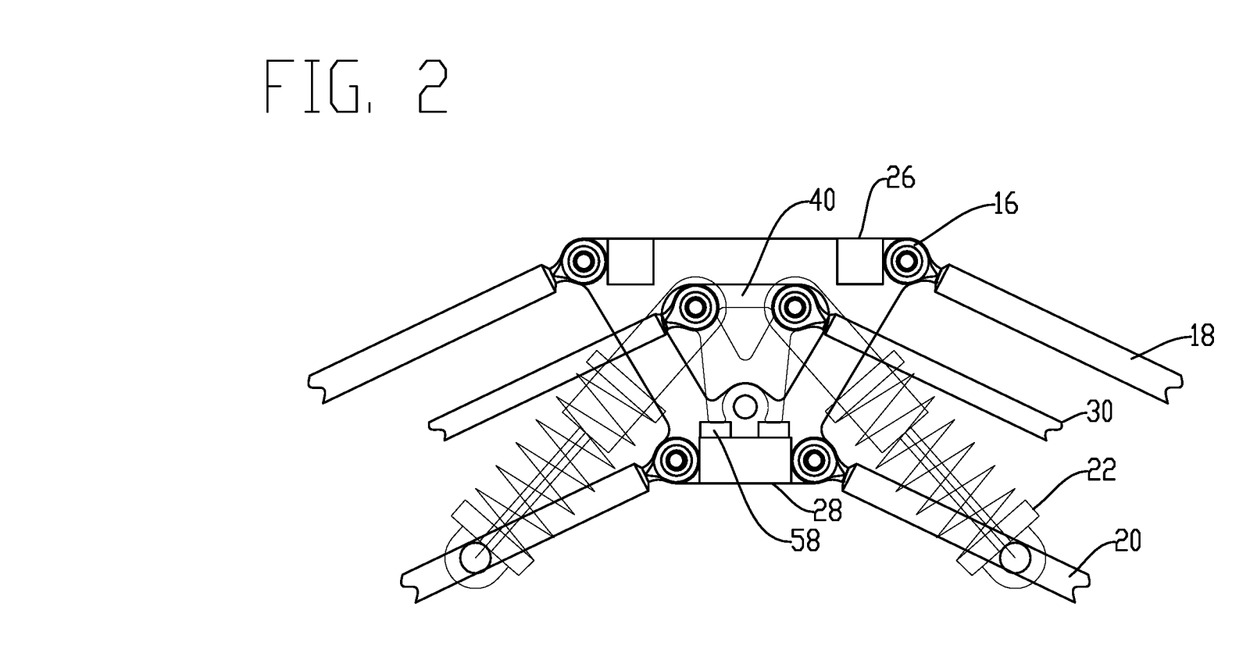
FIG. 2 is a partial view of the suspension and steering components, without the wheel assemblies or deck.

FIG. 2 is a partial view of the front of the device illustrating how the upper 26 and lower 28 frame rails are positioned by the frame support and suspension pivot mounting plate 64. Four rails would be made of square aluminum tubing; which would be welded to eight mounting plates 64. Four in the front of the device and four in the rear, to creating a solid mounting structure for suspension components. The upper 18 and lower 20 suspension links are pivotally connected to the mounting plates 64 using rod end bearings 16. The other end of the suspension links 18, 20 are pivotally connected to the wheel assembly FIGS. 7a, and 7b. The centrally mounted steering mechanism 40 is located along the longitudinal centerline of the frame. This mechanism is pivotally attached to the mounting plates using a long cap screw and thrust washers. Pivotally connecting between the centrally mounted steering mechanism 40 and the lower control arm 20 is a shock absorber with spring 22. Further attached to the same point is a pivotally attached tie rod 30 via rod end bearing 16. Mounted against the top of the lower frame rails 28 and beneath the centrally mounted pivot mechanism 40 is a set of elastomeric bumpers 58. These bumpers provide resistance to leaning of the deck by the rider. Turning characteristics can be adjusted by changing the durometer of the bumpers, or simply removing them. When unloaded, the deck will always return to the horizontal position bases on the equalization of opposing forces produced by the combination of nitrogen charged shock absorber and adjustable spring preload 22.

Figure 3:
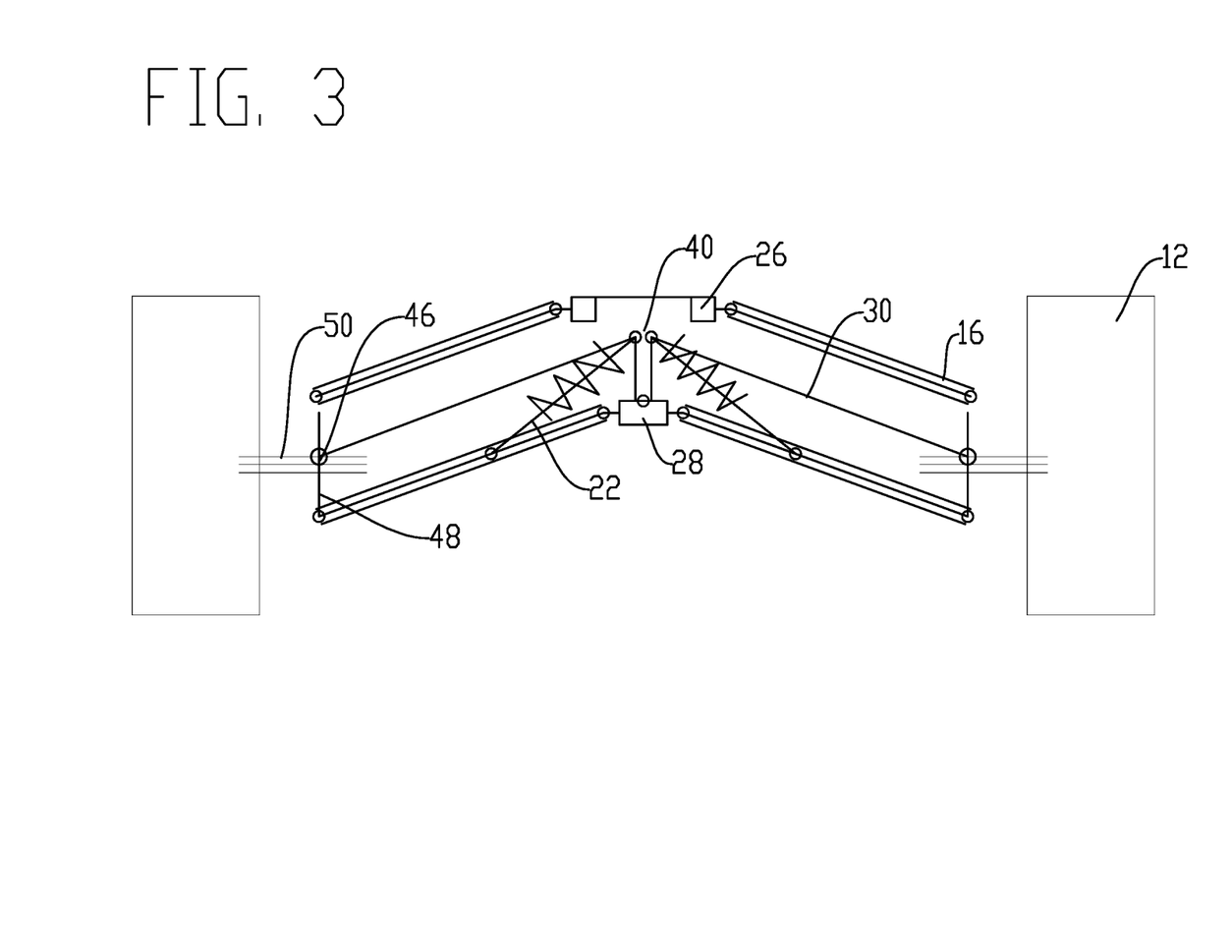
FIG. 3 is a simplified diagram of the suspension and steering components, without the wheel assemblies or deck illustrating the pivot points and how the suspension would look during non-compressed level riding.
Figure 4:
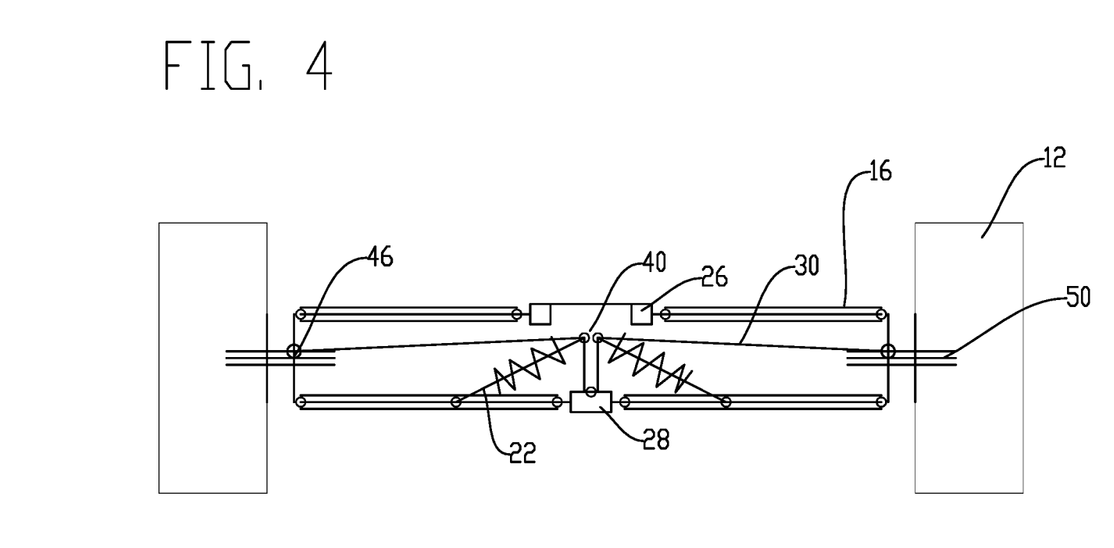
FIG. 4 is a simplified diagram of the suspension and steering components, without the wheel assemblies or deck illustrating the pivot points and how the suspension would look during compression level riding.

FIG. 3 and FIG. 4 are simplified diagrams to illustrate suspension movement during two stages of compression. As the control links 18, 20 move up and down through equal compression of the suspension, the shock and spring 22 becomes compressed. The centrally mounted steering mechanism remains in the vertical position producing no steering reaction to the tie rods 30, only slight toe-in and toe-out movement will be exhibited depending on the suspension dynamics of the particular embodiment.

Figure 5:
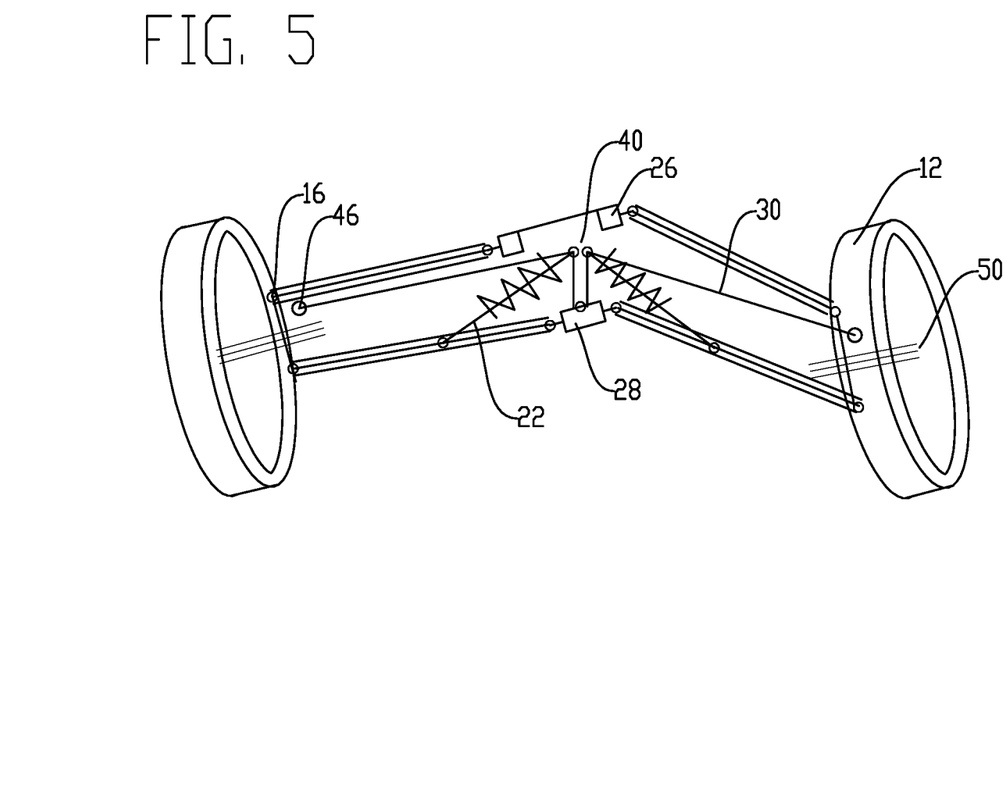
FIG. 5 is a simplified diagram of the suspension and steering components, without the wheel assemblies or deck illustrating the pivot points and how the suspension would look during non-compressed turning resulting from tilting the deck by the rider.

FIG. 5 illustrates the movements that occur when a rider tilts the device by leaning inward on a corner thereby producing changes in suspension geometry. The upper frame rail 26 provides a pivotal mounting location for the upper control arm 18 by means of a rod end bearing 16. The lower frame rail 28 provides both a mounting locations for the lower control arm 20 by means of a rod end bearing 16, and the center steering and suspension pivot 40 by means of a bushing bearing and the mounting plate. The tie rods 30 connect between the spindle steering knuckle 46, and the center steering and suspension pivot 40, via rod end bearings. The upper mounting bolt of the coil over shock absorber 22 performs double duty as a mounting location for the tie rod ends. The lower end of the coil over 22 shock mounts to the lower a-arm 20. The spindles are attached to the upper 18 and lower 20 a-arms via ball joints. When the skateboard is tilted, it produces an axial rotation about the longitudinal axis of the skateboard. The upper frame rail 26 moves either up or down with respect to the horizon depending on the axial rotation. This movement produces proportional camber changes depending on the degree of rotation. It does not; however produce a change in rotation of the center steering and suspension pivot, due to equalization of forces through the movable coil over shock absorber 22. The fact that the center steering and suspension pivot remains unchanged in the vertical plane is the key to the steering mechanism. Since the length of the tie-rod 30 is constant as well as the orientation of the center steering and suspension pivot 40, but the distance to the steering knuckle 46 changes due to camber change induced by axial rotation, the result is to push and pull on the movable steering knuckles 46. This pushing and pulling action on the steering knuckle 46 is what is responsible for the steering of the skateboard. The opposite is realized when tilting occurs in the opposite direction. This can be seen in the diagram by comparing the steering knuckle 46 position, with regards to the center line of the ball joints 48. In this embodiment the diagram shows how this position would move fore and aft of the centerline during turning.

Figure 6:
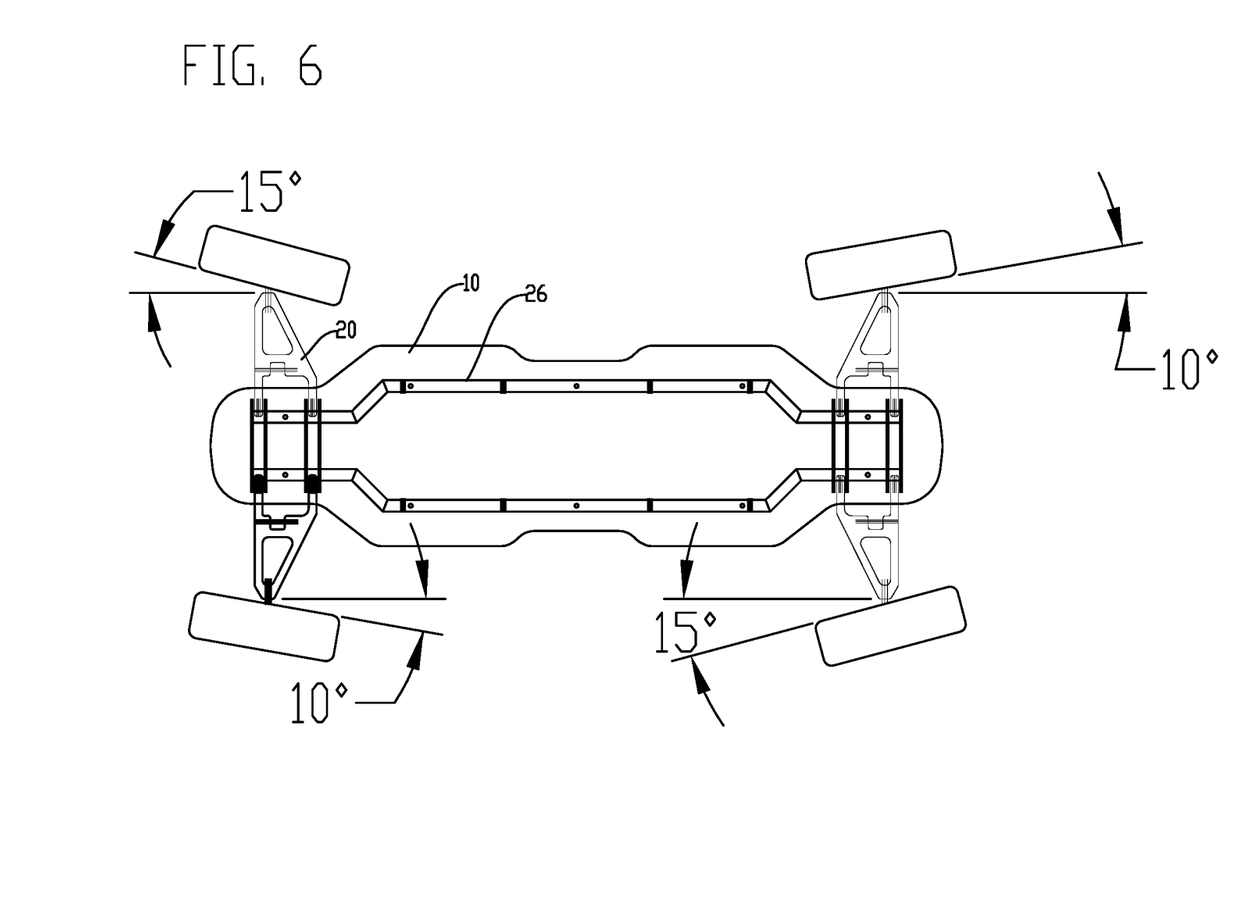
FIG. 6 is a simplified view from above illustrating the associated angular movement of each wheel as the deck is tilted during a turn.

FIG. 6 illustrates how tilting of the deck 10 creates different steering movements depending on the wheels location. Tilting the deck to the left causes the front left wheel 32 to tilt and rotate slightly to the left. The front right wheel 34 tilts the same direction, but rotates further to the left than the front left wheel. Tilting the deck to the left also causes the left rear wheel 36 to tilt and rotate heavily to the right. The right rear wheel 38 also tilts the same direction, but rotates less to the right than the rear left wheel 36. The amount of rotation as well as the difference in rotation is shown for this preferred embodiment; however this can also be adjusted by an increase or decrease in the length of the centrally mounted steering arm to change steering characteristics. The front wheel steering works counter to the Ackerman principle. The rear wheels follow the Ackerman principle. Given that the circumference of the path traced by the wheel is smaller on the inside wheel than the outside wheel, the resulting turning radius of the inside wheel should be shorter than the outside wheel. This principle aims to reduce tire wear on a vehicle by steering the inside wheel more than the outside wheel. In practice however, it has been found that a skateboard being low to the ground by design, and lacking fenders, results in the inside front wheel depositing dirt and other debris, onto the deck 10, shoes, and socks of the rider. This is an undesirable effect for the rider of such a board. By reducing the turning action of the inside front wheel, and increasing the turning action of the outside wheel, this effect is greatly reduced. The same steering system being mounted in reverse on the rear of the skateboard produces results consistent with the Ackerman principle, since dirt and debris are not of concern on the rear wheels because the debris is thrown to the rear of the vehicle behind the rider.

Figure 7A:
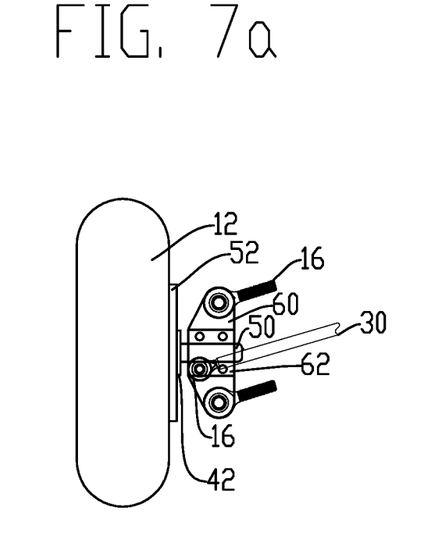
FIG. 7a is a front view of the wheel assembly.

FIG. 7a is a front view of the wheel assembly. This preferred embodiment shows the ground contacting element 12, wrapped around the hub motor 52. Extending from the hub motor is a non rotating axle 50, which is securely bound into the axle mounting block 62. The said block has holes that pass above and below the axle in a tangential orientation, and a slotted hole for the axle to pass through. The mounting plates 60 are attached using cap screws which extend through the mounting block providing a clamping action on the block. One of the cap screws has an extended length to accommodate a spacer, and a rod end bearing. This mount is utilized as a steering knuckle. At the top and the bottom of the mounting plates 60 are mounting locations for the control arm pivot rod end bearing 16.

Figure 7B:
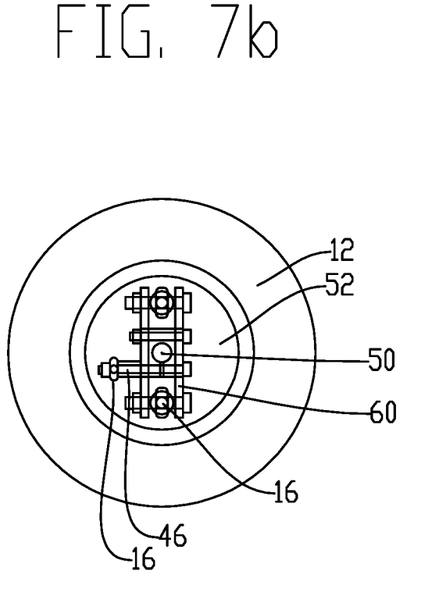
FIG. 7b is a side view of the wheel assembly.

FIG. 7b is a side view of the wheel assembly illustrating the clamping effect of the cap screws that pass all the way through the device. Another embodiment might have an axle held in place by threading the axle the block 60, and using a jam nut to secure it. Yet another embodiment might have the axle held in place by use of a set screw, or any other combination of the above mentioned methods.

Figure 8A:
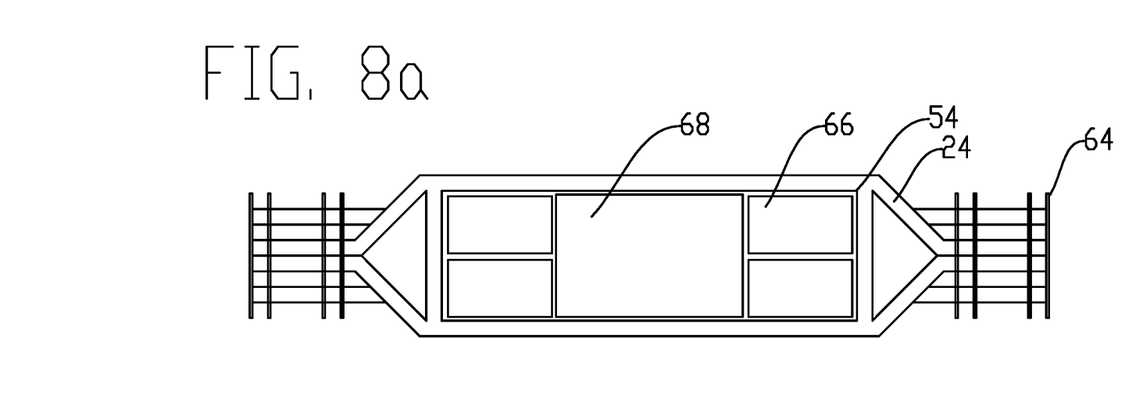
FIG. 8a is a bottom view of the frame and enclosure.

FIG. 8a is a elevation view showing the frame 24, and the eight frame support and suspension pivot plates 64. These items are welded together to create a perimeter area for which the enclosure 54 is mounted. The inside of the enclosure 54 is used to house the electrical components. The battery 68 is mounted in the center of the enclosure. On either side of the battery are the brushless drive controllers 66. The enclosure protects the electronics from the elements, and provides some strengthening of the frame structure. Wiring is completed with a harness inside the enclosure. Motor wiring enters the enclosure at both ends via seal tight connectors. The enclosure is sealed with a lid.

Figure 8B:
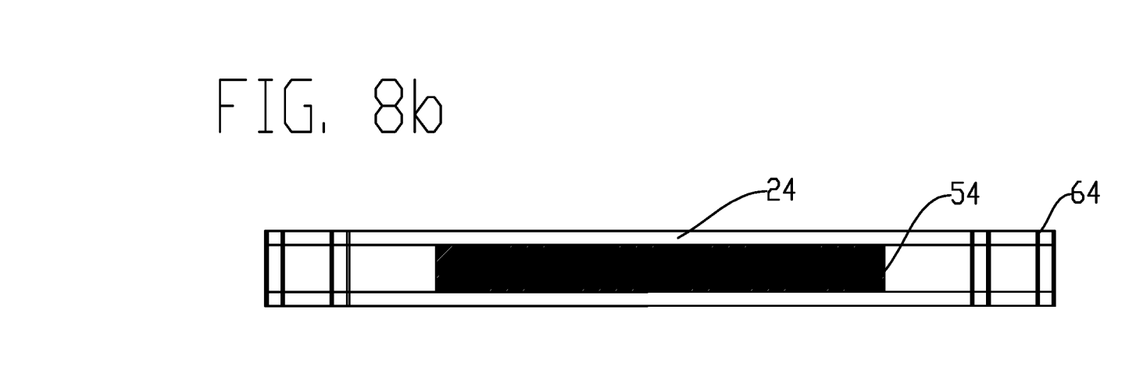
FIG. 8b is a side view of the frame and enclosure.

FIG. 8b is a side view of the frame 24 showing the eight frame support and suspension pivot plates 64. As well as the shaded area of the enclosure 54. The frame system provides a protective cage for the enclosure 54 housing the lithium ion battery 68 which can be known to be hazardous if pierced.

Figure 9:
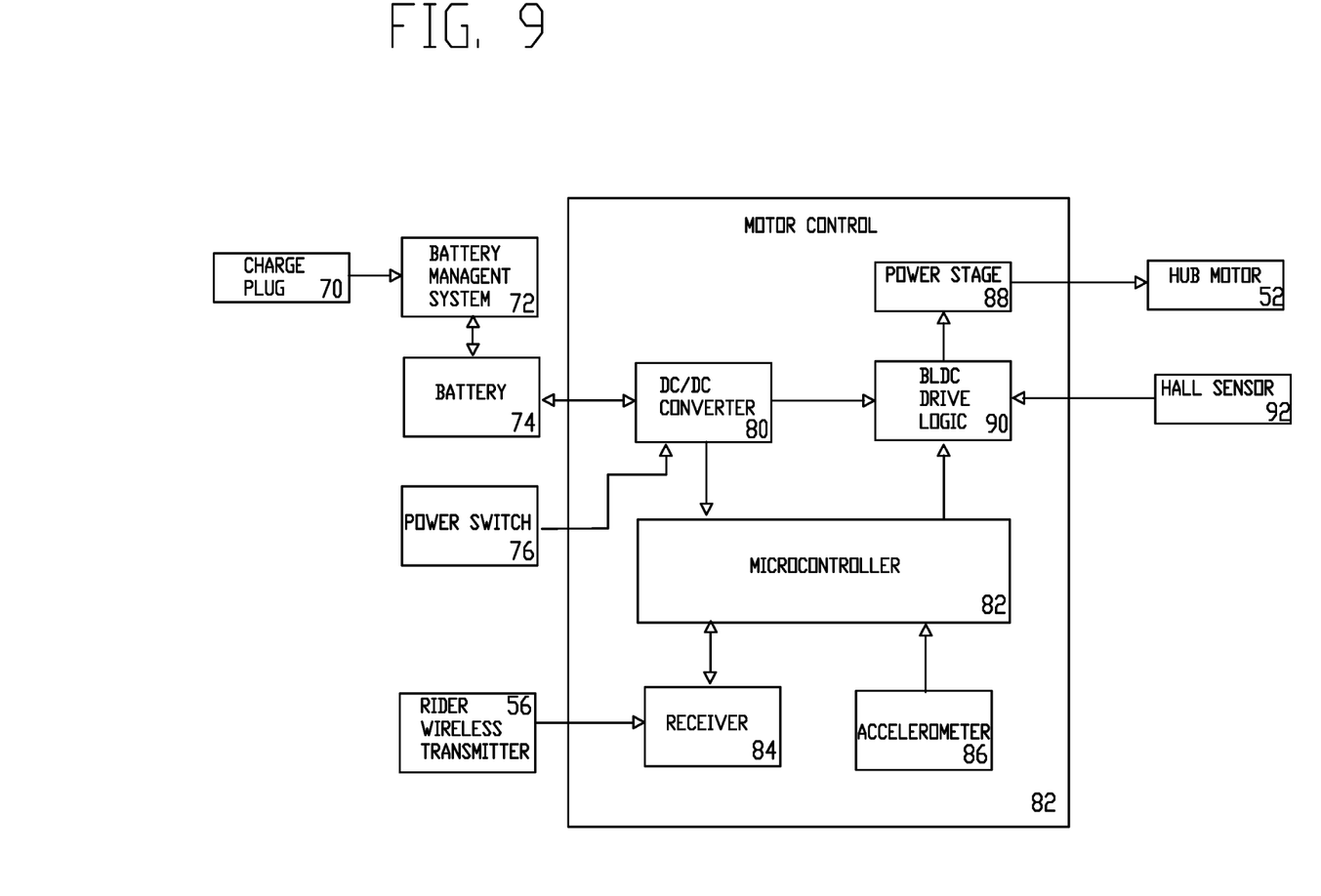
FIG. 9 is a block diagram illustrating how one embodiment would look with its individual components would interconnect to provide a functional system.

FIG. 9 is a block system diagram of the preferred embodiment. The charge plug 70 provides DC voltage to the battery management system 74. The battery management system balances the individual cells of the battery 74, as well as controlling charge current, discharge current, maximum voltage, and cutoff voltage. A power switch 76 mounted on the enclosure enables the system. The microcontroller 82 receives power from the DC/DC converter 80, and input signals from the receiver 84 and the accelerometer 86. The microcontroller 82 outputs velocity commands to the BLDC drive logic 90. These commands are calculated by a combination of inputs from the rider wireless transmitter 56 via the receiver 84, and the accelerometer 86. The rider produces the acceleration or braking actions to be used as analog voltage velocity commands to the BLDC logic. A mathematical algorithm utilizing tilting data from the accelerometer 86 would add or subtract proportional analog voltage velocity commands to the left or right side BLDC motor controllers to aid in turning. Reduced velocity on the inside wheel during a cornering situation than the outside wheel would produce additional turning effectiveness. Additionally, pitch information from the accelerometer 86 would aid in smoothing acceleration and braking. The power stage 88 supplies the voltage and current to the hub motor 52. Hall sensors 92 mounted inside the hub motor 52 provide velocity feedback and angular motor phasing information for the BLDC drive logic 90.

The invention has been described in an illustrative manner, and it is to be understood that the terminology which has been used is intended to be in the nature of the words of description rather than a limitation. Obviously, many modifications and variations of the preferred embodiment are possible in light of the above teachings. For example one embodiment may include a cantilevered shock assembly. Another example of an embodiment may include suspension links of different lengths. Yet another may have two base plates mounted to the deck, instead of a continuous frame system. Yet another might simply be a rolling device void of any motors, electrical system, or remote control whatsoever. It is therefore, to be understood that within the scope of the below claims, the invention may be practiced otherwise than as specifically described. The invention is defined by the claims.

What is claimed is:

1. A wheeled riding device comprising:
   a) A deck;
   b) A rigid chassis affixed to the deck;
   c) A plurality of resilient shock absorbers disposed beneath the said deck and pivotally connected between a plurality of suspension links and a centrally mounted steering mechanism;
   d) A plurality of wheel assemblies including ground contacting elements pivotally connected to said suspension links and disposed at opposite ends of the deck;
   e) A plurality of centrally mounted steering mechanisms, whereby transversely mounted tie rods, and coil over shock absorbers are pivotally connected to the upper portion of said centrally mounted steering mechanisms, said centrally mounted steering mechanism being transversely and pivotally connected to a lower mounting position.

2. The device in claim 1, where at least one wheel assembly includes one or more electrically driven single sided hub motors.

3. The device in claim 2, where at least one motor is internally geared.

4. The device in claim 2, where at least one motor is directly driven.

5. The device in claim 1, where all wheels are direct driven using single sided hub motors.

6. The device in claim 1, where the wheel assemblies include free rolling wheels.

7. The device in claim 1, where said rigid chassis is longitudinally continuous and mechanically affixed to the deck by a securing means and provides mounting points for said suspension links and said steering mechanism.

8. The device in claim 1, where said rigid chassis is non-continuous and is mechanically affixed to the deck by a securing means providing mounting points for said suspension links and said steering mechanism.

9. The device in claim 1, where coil over spring shock absorbing devices are transversely mounted beneath the deck, and attached to a centrally mounted steering mechanism.

10. The device in claim 1, where a centrally mounted steering mechanism pivots as a result of camber changes induced during tilting of the deck thereby generating steering response.

11. The device in claim 1, further provides greater steering response to the outside wheel on the front of said device, and greater steering response to the inside wheel on the rear of said device during turning, thereby minimizing debris collection on the deck.

12. The device in claim 2, where an enclosure containing electrical power and control devices is mounted to said rigid chassis in such a manner as to utilize the enclosure for additional chassis strengthening, additionally said chassis is perimeter mounted, creating a protective cage around said enclosure to prevent damage from debris and impacts.

13. The device in claim 1, further comprising a battery system positioned beneath the deck, battery system electrically connected to motors, wherein the battery system further comprises a regenerative battery charging system.

14. The device in claim 2, where each motor is configured to receive the motor control signal from the controller in response to a user controlled remote control device to be by carried by the rider.

15. The device in claim 14, further has the ability to receive user generated velocity and, braking, commands remotely.

16. The device in claim 2, where at least one accelerometer measures the tilt angle of the deck and creates a differential in the velocity command signal for the motor drives resulting in either slowing of the front and rear wheels on the side of the deck that is tilted down during a turn, or accelerates front and rear wheels on the side of the deck that are tilted up during a turn, or combination thereof enhancing turning capability.

17. The device in claim 1, wherein said:
a) A axle;
b) An wheel or hub motor;
c) An axle mounting device, with a pass-through hole that includes clamping, keyway, setscrew, or any other securing method sufficiently strong to hold said axle in place, preventing rotation, such device also has mounting accommodations for plates, or direct attachment to pivotal bearings whereby said axle and said device can be synergistically utilized as a spindle assembly.

18. The device in claim 1, wherein a plurality of elastomeric bumpers are positioned for compression by the said centrally mounted steering mechanism, and furthermore being adjustable by adding or subtracting said elastomeric to enhance return resistance of the centrally mounted steering mechanism.

* * * * *